US006748582B1

(12) United States Patent
Chiles et al.

(10) Patent No.: US 6,748,582 B1
(45) Date of Patent: Jun. 8, 2004

(54) TASK LIST WINDOW FOR USE IN AN INTEGRATED DEVELOPMENT ENVIRONMENT

(75) Inventors: William P Chiles, Seattle, WA (US); Anders Hejlsberg, Seattle, WA (US); Randy S. Kimmerly, Woodinville, WA (US); Peter E. Loforte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/519,510

(22) Filed: Mar. 6, 2000

Related U.S. Application Data

(60) Provisional application No. 60/123,102, filed on Mar. 5, 1999.

(51) Int. Cl.[7] ................................................. G06F 9/44
(52) U.S. Cl. ........................ 717/111; 717/101; 717/113; 717/114
(58) Field of Search ................................ 717/101, 102, 717/103, 110, 113, 125; 715/530; 709/100, 102

(56) References Cited

U.S. PATENT DOCUMENTS

| | | | | |
|---|---|---|---|---|
| 4,809,170 A | * | 2/1989 | Leblang et al. | 717/122 |
| 5,651,111 A | * | 7/1997 | McKeeman et al. | 717/126 |
| 5,737,608 A | * | 4/1998 | Van De Vanter | 717/112 |
| 5,758,061 A | * | 5/1998 | Plum | 717/131 |
| 6,405,226 B1 | * | 6/2002 | Alpert et al. | 715/530 |

OTHER PUBLICATIONS

PressPass, "Microsoft Unveils Visual Studio 6.0 Enterprise Edition At TechEd Developer Converence", New Orleans Jun. 3, 1998.*
O'Brien, Larry; "The Road from Redmond"; Fawcette Technical Publications; 1998.*
"Task List (Environment—Options Dialog Box", MSDN, Microsoft Visual Studio 6.0 Online Help. Microsoft Corporation, 1991–1998.*
Thomas, Lowell E.; "Visual J++6.0: The Microsoft Java Environment"; 10th Annual ISPCON; Jun. 15, 1998.*
"Microsoft J++6.0"; Microsoft; 1998.*
McKay et al.; "Microsoft Takes Wraps Off Visual J++6.0"; JavaWorld; Apr. 1998.*
Festa, Paul; "Microsoft to Ship Visual J++6.0"; CNET News.com; Oct. 05, 1998.*
"Configuration Manager's Workbench"; Configuration Management Services Limited; 2002.*

* cited by examiner

*Primary Examiner*—Todd Ingberg
*Assistant Examiner*—William H. Wood
(74) *Attorney, Agent, or Firm*—Woodcock Washburn LLP

(57) ABSTRACT

A method, apparatus, and software are disclosed for assisting a software developer in managing tasks to be completed by providing a task list as a unified location for developers to locate errors and warnings in code, as well as specify user-defined tasks. The task list is updated in "real time" as the developer completes tasks and generates new tasks.

75 Claims, 4 Drawing Sheets

TASK LIST WINDOW FOR USE IN AN INTEGRATED DEVELOPMENT ENVIRONMENT

REFERENCES TO RELATED APPLICATIONS

This application claims the benefit of U.S. Provisional Application No. 60/123,102, filed Mar. 5, 1999, which is hereby incorporated herein by reference.

TECHNICAL FIELD OF THE INVENTION

The present invention pertains generally to computer programming, and more particularly to tools for assisting application developers in creating software applications.

BACKGROUND OF THE INVENTION

Customer expectations of software performance and functionality have led to the development of increasingly complex applications. For example, it is not uncommon for applications to consist of millions of lines of code. In addition, modem applications typically include many components that interact with each other and with components outside the application. This increase in the size and complexity of software applications has made the overall amount of information that developers must track and remember increasingly divergent and complex.

Conventional development environments assist developers by identifying and flagging code development errors. Some such development environments are capable of detecting errors as they are input and displaying error messages when they are detected. Even with such capabilities, however, developers often still find it difficult to manage code-specific tasks, as well as related tasks associated with overall application development.

Some development environments attempt to facilitate development by providing developers with task lists that describe tasks that the developer needs to complete. While these tools provide valuable information, their usefulness is generally limited in that the task lists are generated and updated only at specific points in the development process, rather than as the code is input. As a result, the developer does not have ready access to a current list of tasks to be completed. Accordingly, a need continues to exist for a development environment that provides a developer with a current list of development-related tasks.

SUMMARY OF THE INVENTION

According to various example implementations of the invention, a task list facilitates code development by assisting developers in keeping track of and managing a variety of tasks, such as errors to be corrected, opportunities for optimization, and other user-defined tasks. As the developer edits source code, warnings and coding errors are detected and inserted as tasks in a task list. The developer can also embed keywords known as comment tokens in the code. These comment tokens are detected and used to define tasks.

In one particular implementation, source code is evaluated during an interactive code development session to determine whether a comment token is present. If a comment token is present, a task is inserted into a task list. If a task is completed, the task list is modified to indicate completion of the task during the interactive code development session.

In specific implementations, tasks can also be contributed by the compiler, by build/deploy services, and by other modules internal or external to the development environment. Additionally, in certain implementations, tasks can be filtered and sorted according to various criteria.

Yet another implementation is directed to a method of displaying a set of tasks associated with a development project and selecting a displayed task in a computer system having a graphical user interface including a display and a user interface selection device. During an interactive code development session, source code is evaluated to determine whether a comment token is present. If so, a task is inserted into a task list. When a task is completed, the task list is modified during the interactive code development session to indicate that the task has been completed. At least part of the task list is then displayed using the display. A selection signal indicative of a user selection of a task from the displayed tasks is received. A portion of the input source code is then displayed that corresponds to the associated location in the source code.

Still another implementation is directed to a computer-readable medium having computer-executable modules stored on it. One such module is a parser module that parses source code while it is being input by a developer to detect the presence of comment tokens. When a comment token is detected, a task module inserts a task into a task list. When a task has been completed, the task module modifies the task list to indicate this fact. A display module displays the task list. Another implementation is directed to a computer arrangement having these modules. In another particular implementation, a token interface module detects changes to the set of comment tokens and generates a notification in response to a change to the set of comment tokens.

The above summary of the present invention is not intended to describe every implementation of the present invention. The figures and the detailed description that follow more particularly exemplify these implementations.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
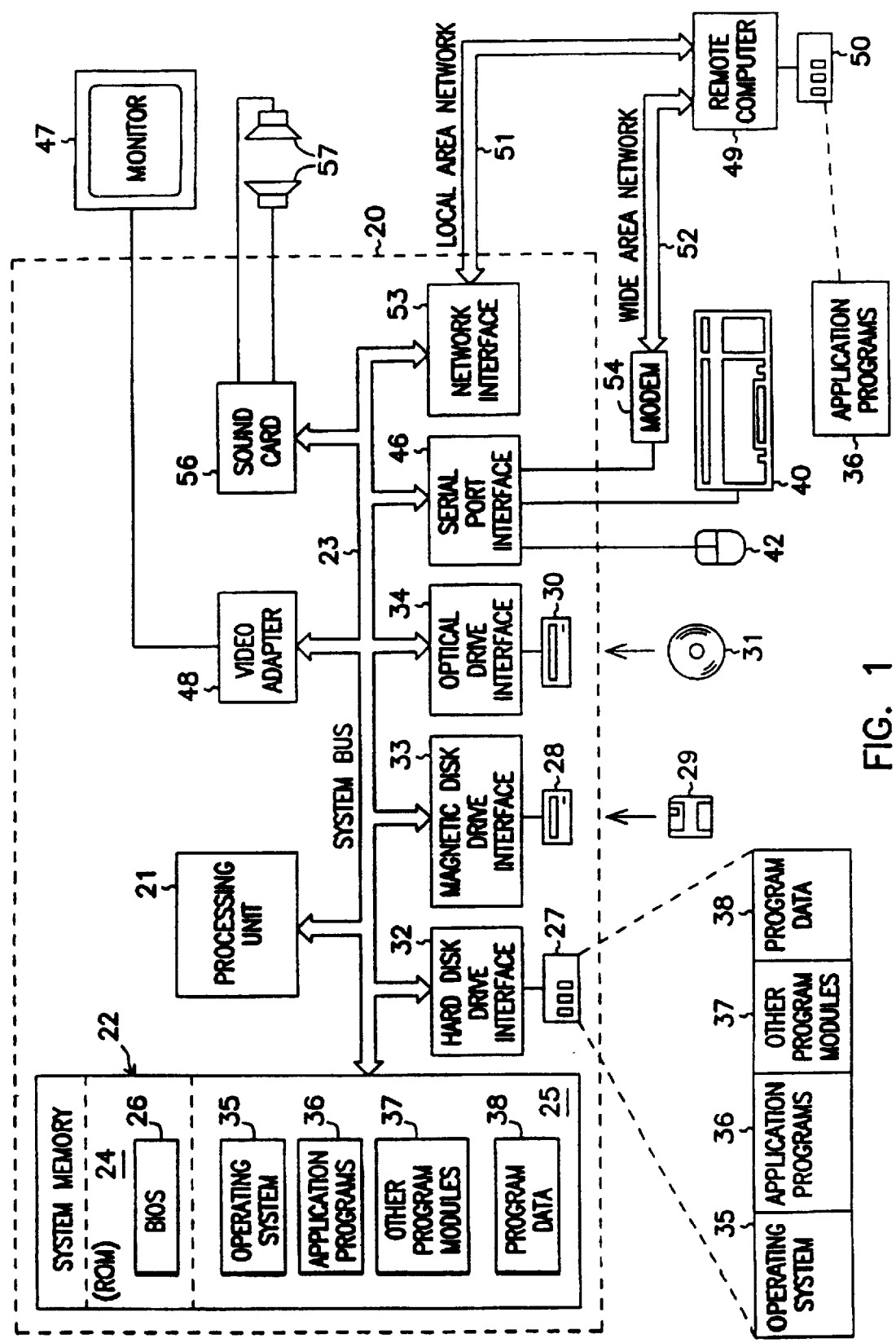
FIG. 1 illustrates a simplified overview of an example embodiment of a computing environment for the present invention.

FIG. 1 illustrates a hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer-system configurations, including hand-held devices, multiprocessor systems, microprocessor-based or programmable consumer electronics, network personal computers ("PCs"), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows a computer arrangement implemented as a general-purpose computing or information-handling system 80. This embodiment includes a general purpose computing device such as personal computer (PC) 20, that includes processing unit 21, a system memory 22, and a system bus 23 that operatively couples the system memory 22 and other system components to processing unit 21. There may be only one or there may be more than one processing unit 21, such that the processor computer 20 comprises a single central-processing unit (CPU), or a plurality of processing units, commonly referred to as a parallel processing environment. The computer 20 may be a conventional computer, a distributed computer, or any other type of computer; the invention is not so limited.

In other embodiments other configurations are used in PC 20. System bus 23 may be any of several types, including a memory bus or memory controller, a peripheral bus, and a local bus, and may use any of a variety of bus architectures. The system memory 22 may also be referred to as simply the memory, and it includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system.

Personal computer 20 further includes hard disk drive 27 having one or more magnetic hard disks (not shown) onto which data is stored and retrieved for reading from and writing to hard-disk-drive interface 32, magnetic disk drive 28 for reading from and writing to a removable magnetic disk 29, and optical disk drive 30 for reading from and/or writing to a removable optical disk 31 such as a CD-ROM, DVD or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives 27, 28, and 30 and their associated computer-readable media 29, 31 provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic tape cassettes, flash-memory cards, digital video disks (DVD), Bernoulli cartridges, RAMs, ROMs, and the like.

In various embodiments, program modules are stored on the hard disk drive 27, magnetic disk 29, optical disk 31, ROM 24 and/or RAM 25 and may be moved among these devices, e.g., from hard disk drive 27 to RAM 25. Program modules include operating system 35, one or more application programs 36, other program modules 37, and/or program data 38. A user may enter commands and information into personal computer 20 through input devices such as a keyboard 40 and a pointing device 42. Other input devices (not shown) for various embodiments include one or more devices selected from a microphone, joystick, game pad, satellite dish, scanner, or the like. These and other input devices are often connected to the processing unit 21 through a serial-port interface 46 coupled to system bus 23, but in other embodiments they are connected through other interfaces not shown in FIG. 1, such as a parallel port, a game port, or a universal serial bus (USB) interface. A monitor 47 or other display device also connects to system bus 23 via an interface such as a video adapter 48. In some embodiments, one or more speakers 57 or other audio output transducers are driven by sound adapter 56 connected to system bus 23. In some embodiments, in addition to the monitor 47, system 80 includes other peripheral output devices (not shown) such as a printer or the like.

In some embodiments, personal computer 20 operates in a networked environment using logical connections to one or more remote computers such as remote computer 49. Remote computer 49 may be another personal computer, a server, a router, a network PC, a peer device, or other common network node. Remote computer 49 typically includes many or all of the components described above in connection with personal computer 20; however, only a storage device 50 is illustrated in FIG. 1. The logical connections depicted in FIG. 1 include local-area network (LAN) 51 and a wide-area network (WAN) 52, both of which are shown connecting PC 20 to remote a computer 49; typical embodiments would only include one or the other. Such networking environments are commonplace in offices, enterprise-wide computer networks, Intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20 and connects to system bus 23 via serial-port interface 46 in the embodiment shown. In a networked environment, program modules depicted as residing within PC 20 or portions thereof may be stored in remote-storage device 50. Of course, the network connections shown are illustrative, and other means of establishing a communications link between the computers may be substituted.

Software may be designed using many different methods, including object-oriented programming methods. C++ and Java are two examples of common object-oriented computer programming languages that provide functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in some embodiments.

An interface is a group of related functions that are organized into a named unit. Some identifier may uniquely identify each interface. Interfaces have no instantiation; that is, an interface is a definition only without the executable code needed to implement the methods that are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

Example Embodiments of the Invention

According to one example embodiment of the present invention, a development tool provides a developer with a unified interface for tracking warnings and errors in code, as well as comment tasks, user-defined tasks, and shortcuts to lines of code. These tasks are displayed in a list that is updated in the background as the developer works in an interactive development environment to, for example, edit code. As the developer interacts with the source code through the interactive development environment, syntax errors are detected and inserted into a task list as tasks to be completed. These syntax errors can occur either in code directly input by the developer or in code that was automatically generated by a wizard application and edited by the developer.

The developer can also specify user-defined tasks by using a user interface to input data into task-related fields, such as a task description, a priority rating, etc. Comment tasks are specified by using key tokens at the beginning of a comment in the code itself. A pluggable architecture allows packages and add-in applications to organize and contribute additional tasks to the task list. Within the task list, tasks can be sorted and filtered according to various criteria, allowing the developer to manage tasks and view them in a format useful to the particular developer. In addition, the tasks in the list are associated with shortcuts to locations within the code that are relevant to the tasks.

Figure 2:
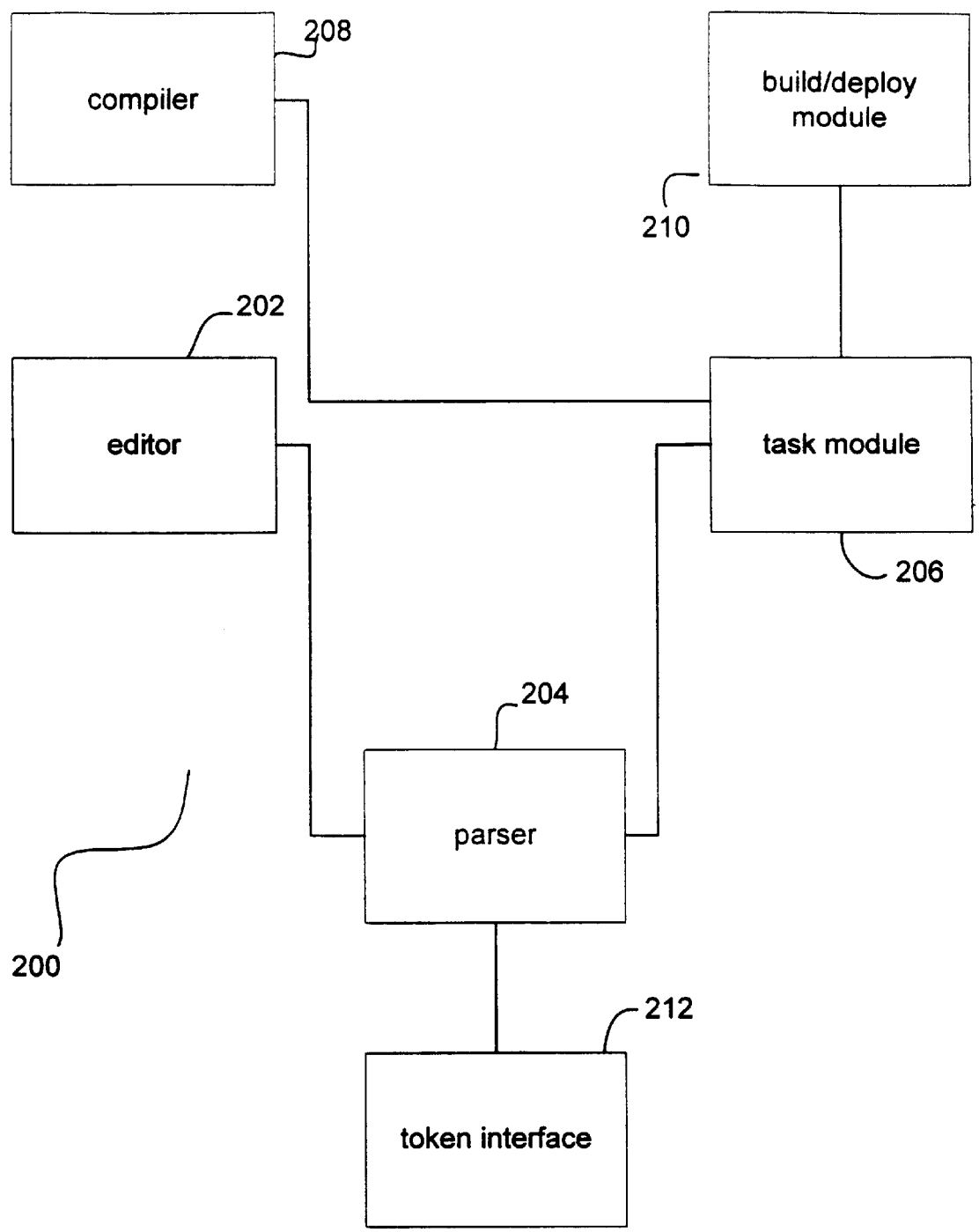
FIG. 2 illustrates an example development environment in which the present invention may be implemented.
Figure 3:
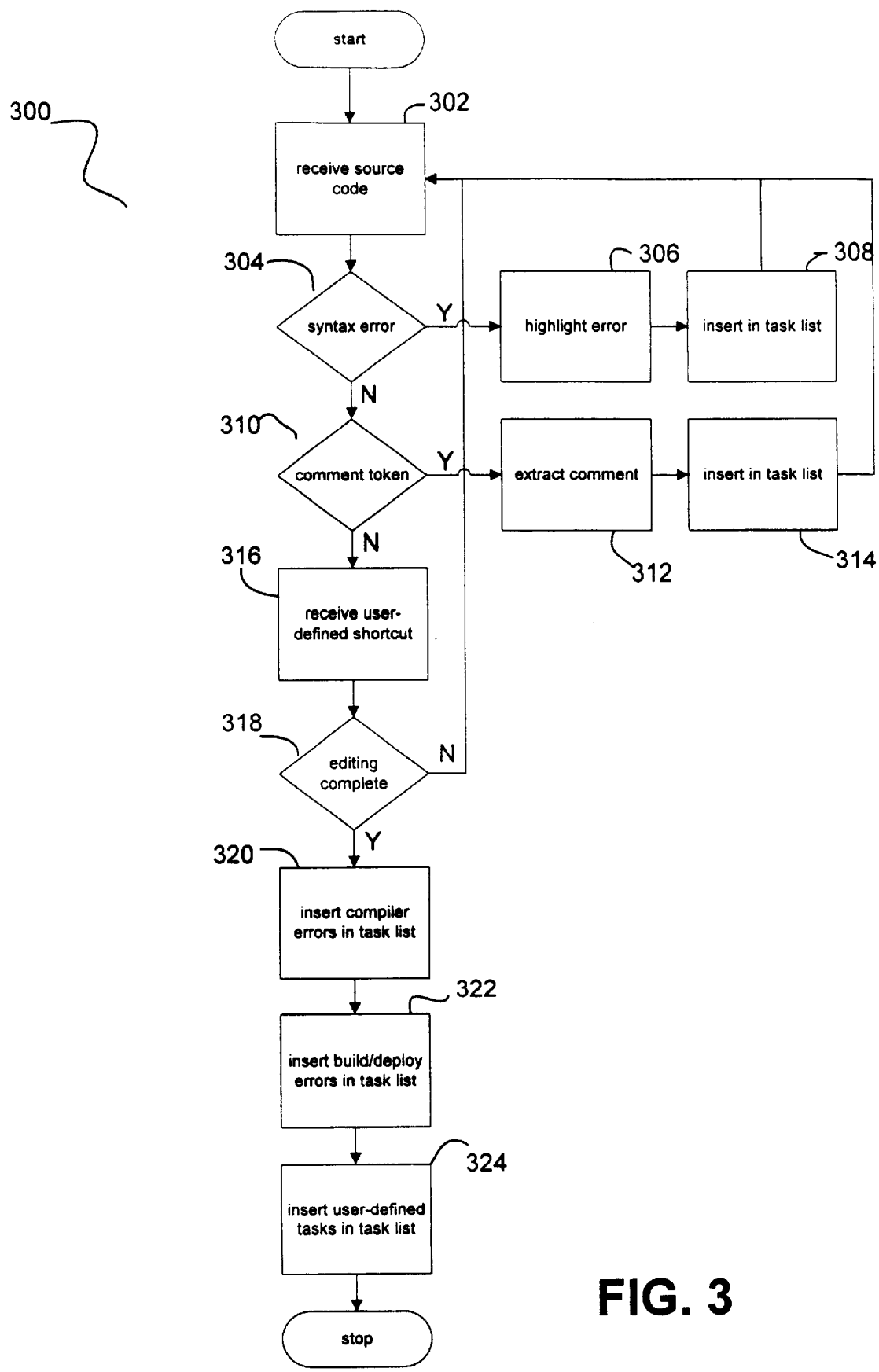
FIG. 3 is a flowchart depicting an example process for implementing an embodiment of the present invention.

Referring again to the drawings, FIG. 2 depicts an example development environment 200 according to a particular embodiment of the present invention. FIG. 3 is a flowchart illustrating one example process 300 for managing development tasks that can be implemented using the development environment 200 of FIG. 2, according to another embodiment of the present invention. The development environment 200 includes an editor 202, which the developer uses to input and edit code. A parser 204 works in "real time," i.e., in the background as the developer interacts with the development environment to edit source code, to extract and interpret code, detecting warnings and errors in code as well as tokens inserted by the developer. As the parser 204 identifies these errors, warnings, and tokens, a task module 206 organizes them into a task list, which is displayed for the developer's reference. The task module 206 additionally sorts the tasks in order of priority, category, or on other attributes specified by the developer. Developers can thus control the sorting characteristics of the task list to arrange tasks in the manner best suited to their work.

As depicted at a block 302 of FIG. 3, the parser 204 receives source code input by the developer or provided by some other source, such as a code development wizard application. As the developer edits the source code, the parser 204 determines whether the source code is valid, as depicted at a decision block 304. If the source code is invalid, the parser 204 causes the development environment 200 to call attention to the error, for example, by highlighting or underlining the invalid code, as illustrated at a block 306. In addition, at a block 308, the task module 206 adds the error to a task list window, providing the complete error message, line number at which the error occurred, and a priority rating. Later, to visit a particular error in the code, the developer need only navigate to the task in the task list by, for example, double-clicking on the task. Navigating to the task causes the editor 202 to jump to the location at which the corresponding error occurred, thus obviating the need to find the error manually. When the parser 204 determines that the developer has corrected the error, it is removed from the task list.

Tasks can also be identified using tokens or keywords. These tokens or keywords typically preface comment lines in the code and may include predefined labels such as, for example, "UNDONE," "TODO," or "HACK," as well as labels that are defined by the individual developer. If the source code has no syntax errors, the parser 204 determines whether any of the keywords are present in the source code at a decision block 310. If so, at a block 312, the parser 204 extracts the comment from the source code and uses the tag to determine the priority of the task. The task is then inserted in the task list at a block 314. For example, if the source code contains the comment, "/*TODO: Need to add copyright text*/", the parser 204 adds the task "TODO: Need to add copyright text" to the task list with a priority rating assigned to the "TODO" tag. To visit this location in the code, the developer selects the task from the task list, causing the editor 202 to jump to the corresponding location automatically. Thus, the developer need not manually search for keywords, as in many conventional development environments.

Another way to mark locations that the developer wishes to revisit is to create shortcuts, as depicted at a block 316. To do this, the developer selects the desired location in the code, for example, by right-clicking on it with the mouse, and instructs the development environment 200 to create a shortcut. The task module 206 then creates a shortcut having a name derived from the line of source text at the selected location. This method of marking locations for revisiting is different from tagging in that nothing is inserted in the code itself.

If the source code contains neither errors nor tokens, execution proceeds to a decision block 318, at which it is determined whether the editing session is complete. If not, flow returns to the block 302, at which the parser 204 receives additional code from the editor 202. This process of receiving code and parsing it for errors or other tasks to insert in the task list continues until the developer has finished the editing session.

After the editing session is complete, other components in the development environment 200 can contribute tasks to the task list. For example, at a block 320, a compiler module 208 optionally sends to the task module 206 compiler errors and warnings that were not detected by the parser 204, including semantic errors, such as, for example, the use of expressions as arguments to a function that would result in incorrect types of values for the arguments. Because compilation cannot be performed properly until coding and compilation errors are resolved, all such errors are considered high priority. As the compiler runs, it can cause the task module 206 to automatically filter for compiler errors, such that the task list shows only compiler errors. If the developer was previously working in a different filtering/sorting state, the developer can switch between the previous state and the compiler error-only state, depending on which tasks the developer wishes to focus efforts on. Similarly, a build/deploy module 210 may send errors and warnings that it detects to the task module 206 for insertion in the task list, as depicted at a block 322.

Each compiler and build/deploy error is associated with a location in the code to which navigation is possible by selecting the task in the task list. In addition, moving the mouse or pointing device over the error in the code causes the full error message to be displayed, for example, in a pop-up window. Help in resolving compiler errors can be accessed using a mouse command or a hot key, such as F1. As with coding errors and comment tasks, the developer can check off compiler and build/deploy errors in the task list to indicate that they have been resolved.

As illustrated at a block 324, the developer can also specify user-defined tasks that are not necessarily related to particular locations in the code. Indeed, the task need not even be related to the development process at all. To define a task, the developer enters text directly into the description field of the task list window and optionally selects a priority rating, rather than embedding a comment in the code itself, as is the case with comment tasks.

Other modules in addition to those depicted in FIG. 2 can send tasks to the task module 206 for insertion in the task list window. An applications programming interface (API) allows packages that plug into the development environment 200 to contribute to the task list. For example, after attempting to deploy a solution, action items can be displayed for finishing deployment.

Figure 4:
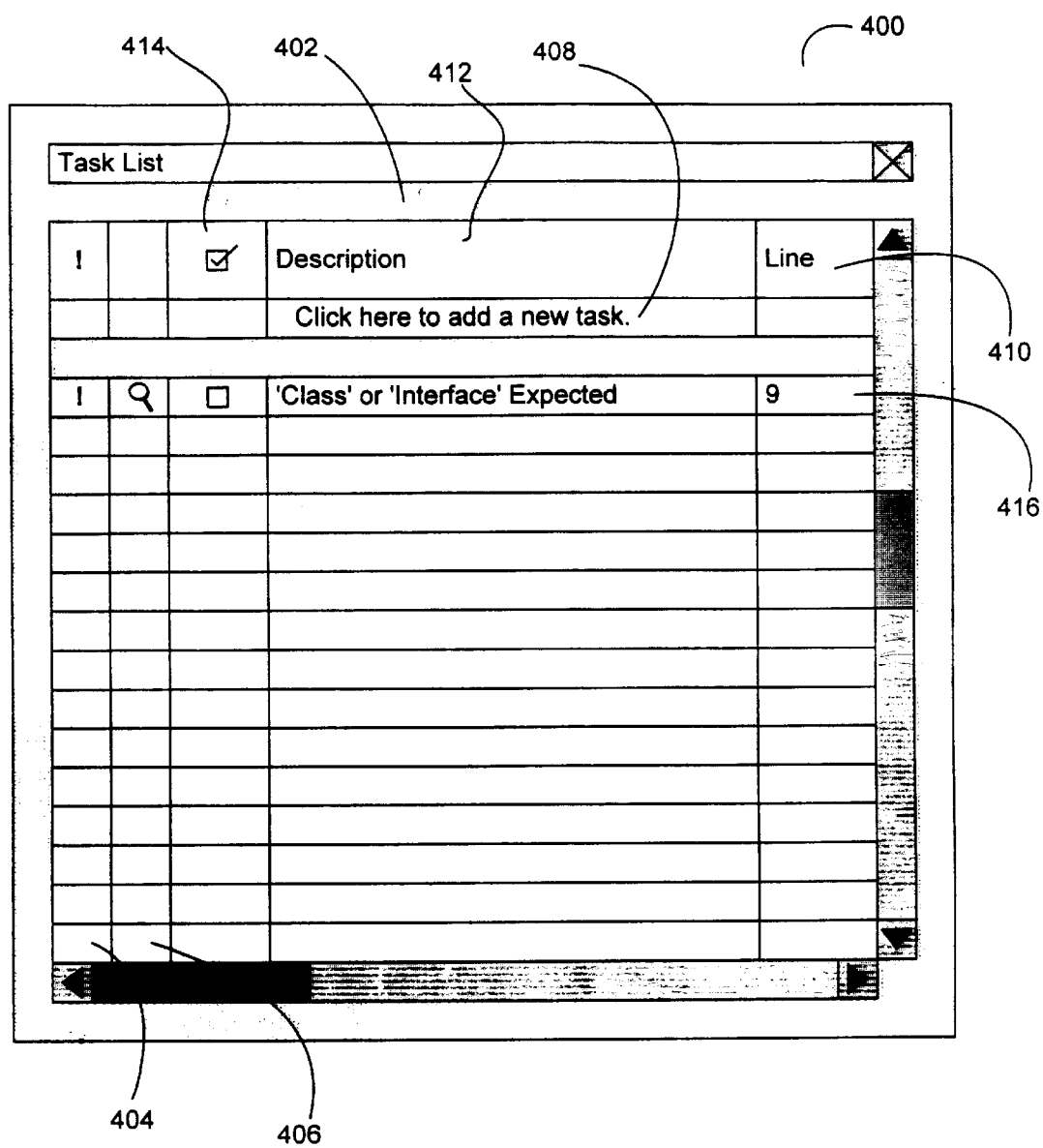
FIG. 4 is an example graphic representation of a task list generated according to an implementation of the present invention.

FIG. 4 depicts an example of a task list window 400 generated and updated according to the present invention. The task list window 400 includes a table 402 having a number of fields or columns. A priority column 404 provides quick reference to the priority rating of various tasks. A category column 406 distinguishes among various categories of tasks, such as coding errors, warnings, and other types of tasks using, for example, glyphs or icons. In one implementation, there is a fixed set of categories to which tasks can be assigned. Each category can be further divided into subcategories. For instance, one category might be compiler-related tasks, which might in turn be divided into Java Compiler and Build/Deploy subcategories. As another example, a comment category might be divided into ToDo, Hack, and Undone categories. Each category and subcategory is associated with a glyph that is displayed in the category column 406. In a particular implementation, the categories include parser (also known as "smart editor"), compiler, comment, shortcut, and user categories. Other categories can be defined in addition to the ones enumerated.

Parser-detected tasks essentially consist of syntax errors. Because these tasks must be resolved before compilation, they are always high priority; the developer is not permitted to assign a different priority level. In addition, the developer cannot delete parser-detected tasks or mark them as completed. Rather, these tasks are automatically deleted from the task list or marked as completed when the errors have been resolved. Parser-detected tasks need not be persisted separately from the file itself. Instead, the list of parser-detected tasks is restored and updated when the file is opened for editing.

Compilers and the build/deploy service contribute error and warning tasks to the compiler category. Errors have a high priority, while warnings are assigned a medium priority. Each compiler and service uses a distinct subcategory. Compiler tasks are different from parser-detected tasks in that they result from semantic analysis rather than syntactic analysis. As a result, compiler tasks may result from or be resolved by code in a location different from the reported location of the error, or even in another file.

Because not all compilers continually execute or maintain dependency information to automatically maintain their task items, it is desirable to permit editing of some of the fields of compiler tasks. Also, it should be noted that compiler and parser-detected tasks need not be coordinated. For example, a particular syntax error can result in both parser-detected and compiler tasks. Unlike parser-detected errors, compiler tasks can be checked as having been completed and can be deleted because they are only detected in response to a specific action on the part of the developer, e.g., performing a build. In performing a build, the developer typically obtains a list of compiler errors, addresses each error in turn, and attempts the build again until no more errors result. Because compiler tasks are not automatically removed or marked as completed, it is desirable to allow the developer to delete them. When the developer performs a new build, old errors are removed and new ones, if any, take their place. By contrast, parser-detected errors are automatically detected and added to or removed from the task list as the developer enters code. Like parser-detected errors, however, compiler tasks are not persisted.

The comment category includes tasks that are defined by comments inserted in the code by the developer. These comments are identified by tokens, such as "TODO:," "UNDONE:," and "HACK:." In addition, the developer can add new tokens and edit their names. The developer cannot, however, change the name of the "TODO:" token. Reserving the "TODO:" token in this manner provides a certain way for other applications to contribute to the task list by marking the code with comments prefaced by the "TODO:" token. The "TODO:" token is localized so that it works in any locale, and other applications that embed comment tasks in the code can always use a locale appropriate token for the "TODO:" token.

Addition of new tokens and modification of existing tokens is handled by a comment token interface, depicted at reference numeral 212 of FIG. 2, that notifies other applications of changes to the set of tokens. The comment token interface 212 provides access to the current set of comment task tokens. Each comment task token is represented by an interface that has properties corresponding to the text and priority rating of the token. Other interfaces include an enumerator interface for a collection of comment task tokens and an event set for events related to the task list. For example, one interface notifies applications that the set of comment task tokens has been modified.

The token for a comment task can be any string that begins with an alphanumeric character and contains arbitrary characters after the first character. The first character of the token must be the first alphanumeric character in the comment or, in the case of a multi-line comment, the first alphanumeric character in a line of the comment.

Comment tasks have a predetermined priority rating, such as low priority, that can be specified in advance for each type of token. In one embodiment, because comment tasks are not persisted, the developer is not permitted to assign a different priority to a particular comment task. However, the developer can add tokens to which different priority levels are assigned in advance. For example, the developer can add a "TODO1:" token that indicates that the task is medium priority. The developer is also not allowed to edit the description of comment tasks because they are not persisted. When the developer deletes the comment token, the associated item is deleted from the task list. Because the developer can remove comments once he or she has corrected the code, the developer is also not allowed to check the task as completed. Other implementations, however, allow the developer to edit and delete comment tasks from the task list window itself.

Shortcut tasks are defined using the context menu in the editor. The text of the line containing the insertion point becomes the shortcut's name, and the name is the task item's description. This description can be edited for the convenience of the developer without affecting the source code. For example, the developer can edit the description to make it shorter or more easily remembered. In addition, in some implementations of the present invention, the developer can change the priority and checked/unchecked status of named shortcut tasks. These tasks are persisted on a per solution, per user basis.

User-defined tasks are created by entering the appropriate information into the description edit field at the top of the task list window. The description edit field, depicted at reference numeral 408 of FIG. 4, is a blank task that appears at the top of the task list. When the developer is finished entering the user-defined task, it is inserted into the task list at a location appropriate to the current filtering and sorting scheme. If the current filtering criteria would cause the newly defined task not to be displayed, a message box appears and alerts the developer to this fact.

Referring again to FIG. 4, the location in the code, if any, corresponding to the task is indicated in a location column 410. A description column 412 contains a brief description of the task and is also used to enter user-defined tasks, as described above in connection with block 322 of FIG. 3. A status column 414 indicates whether each task has been completed using, for example, a check mark to denote completed tasks. Other columns may be present in the task list window 400 to further describe tasks.

The tasks themselves appear as rows 416 in the task list window 400. In a particular embodiment, the appearance of particular tasks, e.g., font and/or color, is determined by one or more characteristics attributable to each task. For example, comment tasks may appear in one font, while syntax errors may appear in another. High priority tasks might be displayed in a distinctive color, such as red, so as to draw attention to them.

Tasks can be filtered so that only tasks meeting specified criteria, e.g., unfinished tasks, appear in the task list window 400. Filtering allows the developer to focus attention on particular tasks of interest. Tasks can be filtered on other criteria, such as category and file. A filtering operation begins with the complete list of task items and displays those tasks that meet the filtering criteria. In a particular implementation, tasks are arranged in a list that can be drilled down by further filtering a list that has already been filtered. A filtering operation that selects a category for display implicitly sorts the display by subcategories within the selected category. Filtering causes the task module 206 to notify task items as to whether they are displayed in the current view. Task contributors, such as add-in modules or other applications, can then coordinate their user interfaces, or associated user interfaces, with those task items.

In addition, the tasks can be sorted on the filtering criteria. For example, the developer can specify that, while all tasks should be displayed, unfinished tasks should appear before finished tasks. By default, tasks are sorted by category and subcategory. Within each subcategory, tasks are sorted by file and line number. These criteria can be changed by the developer by clicking in the column headers. For example, clicking in the category column causes tasks to be sorted by category first. By comparison, clicking in the file or line column header causes tasks to be sorted by file, then by line numbers within each file. Further, clicking in a column by which tasks have already been sorted causes the tasks to be sorted in reverse order. When the developer chooses to view all tasks, the task list maintains whatever sorting criteria were in effect before showing all tasks. As task contributors add more items to the task list, the newly added items are sorted into the current display of task items, provided that they satisfy the current filtering criteria. If the current filtering criteria are not satisfied, a message box appears to indicate that the newly added task will not appear in the list based on the current filtering criteria.

Whenever the developer filters or sorts the task list, the task module 206 stores the current filtering and sorting state. The developer can restore this state by choosing to display the previous view.

Except as noted above, the developer can delete tasks or check them to mark them as complete. These operations are distinct from each other. Checking tasks as done allows the developer to track his or her progress in code development. For some task contributors, however, checking a task as done is equivalent to deleting it. In some implementations, tasks cannot be restored to the task list once they are deleted without opening the document containing the code. Multiple tasks can be checked or deleted using conventional techniques for selecting multiple items in a graphic user interface, such as dragging.

While the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms such as a computer program encoded in a machine-readable medium, such as a CD-ROM, magnetic medium, ROM or RAM, or in an electronic signal. Further, as used in the claims herein, the term "module" shall mean any hardware or software component, or any combination thereof.

What is claimed is:

1. A computer-implemented method for managing development-related tasks, the method comprising:
   during an interactive code development session, evaluating source code to determine whether a comment token is present;
   in response to determining that the source code contains a comment token, inserting a task into a task list; and
   in response to completion of a task, modifying the task list during the interactive code development session to indicate that the task has been completed.

2. The method of claim 1, wherein the comment token is associated with a keyword defined before the interactive code development session.

3. The method of claim 1, wherein the comment token is associated with a keyword specified by a developer during the interactive code development session.

4. The method of claim 1, wherein the comment token is associated with a keyword not subject to modification by the developer.

5. The method of claim 1, wherein the comment token is selected from a set of comment tokens, and further comprising monitoring changes to the set of comment tokens and generating a notification in response a change to the set of comment tokens.

6. The method of claim 1, further comprising:

associating a location in the source code with the inserted task; and in response to navigation to the inserted task, displaying a portion of the source code corresponding to the associated location.

7. The method of claim 1, further comprising, in response to determining that the source code contains a comment token:

extracting a segment of the source code following the comment token; and associating the extracted segment with the inserted task.

8. The method of claim 1, further comprising inserting into the task list a task specified by a developer during the interactive code development session.

9. The method of claim 8, wherein the task is specified by selecting a location in the source code.

10. The method of claim 8, wherein the task is specified by receiving a task description from the developer.

11. The method of claim 1, further comprising associating a priority rating with the inserted task.

12. The method of claim 11, further comprising:

during the interactive code development session, evaluating the source code to determine whether a syntax error is present; and determining the priority rating associated with the inserted task as a function of whether the source code contains a syntax error or a comment token.

13. The method of claim 12, wherein the priority rating associated with the inserted task is further determined as a function of a type of the comment token contained in the input source code.

14. The method of claim 12, wherein the priority rating associated with the inserted task is further determined as a function of a type of the syntax error.

15. The method of claim 1, further comprising responding to at least one of a build error and a deployment error by inserting a task into the task list.

16. The method of claim 1, further comprising inserting a task into the task list in response to receiving information from an external module.

17. The method of claim 1, further comprising:

receiving at least one filtering criterion; and displaying at least a subset of tasks selected from the task list as a function of the at least one filtering criterion.

18. The method of claim 17, wherein the at least filtering criterion includes at least one of a completion status, a task category, a file, and a location.

19. The method of claim 18, wherein the task category is divided into a plurality of subcategories.

20. The method of claim 1, further comprising sorting a plurality of tasks in the task list as a function of at least one sort criterion.

21. The method of claim 20, wherein the at least one sort criterion includes at least one of a completion status, a task category, a file, and a location.

22. The method of claim 21, wherein the task category is divided into a plurality of subcategories.

23. The method of claim 1, further comprising:

monitoring a completion status of a plurality of tasks in the task list; and in response to completion of a task, deleting the completed task from the task list.

24. A computer-implemented method for dynamically maintaining a list of tasks related to development of a project, the method comprising:

parsing source code during an interactive code development session to detect the presence of at least one of a syntax error and a comment token while the source code is being input;

in response to detecting a comment token, inserting a task into a task list with an associated priority rating determined as a function of a type of the comment token;

in response to detecting a syntax error, inserting a task into the task list with an associated priority rating determined as a function of a type of the syntax error;

selectively displaying at least a subset of tasks in the task list as a function of at least one filtering criterion, each displayed task being displayed in a manner determined by at least one characteristic attributable to it; and in response to completion of a task, modifying the task list to indicate that the task has been completed.

25. A computer-readable medium having computer-executable modules stored thereon, comprising:

a parser module configured to parse source code during an interactive code development session to detect the presence of a comment token;

a task module in communication with the parser module and configured to respond to detection of the comment token by inserting a task into a task list and to respond to completion of a task by modifying the task list to indicate that the task has been completed; and a display module in communication with the task module and configured to display the task list.

26. The computer-readable medium of claim 25, wherein the comment token is associated with a keyword defined before the interactive code development session.

27. The computer-readable medium of claim 26, wherein the comment token is associated with a keyword specified by the developer during the interactive code development session.

28. The computer-readable medium of claim 26, wherein the comment token is associated with a keyword not subject to modification by the developer.

29. The computer-readable medium of claim 26, wherein the comment token is selected from a set of comment tokens, and further comprising a token interface module in communication with the parser module and configured to detect a change to the set of comment tokens and to generate a notification in response to a change to the set of comment tokens.

30. The computer-readable medium of claim 25, wherein the task module is further configured to:

associate a location in the source code with the inserted task; and in response to selection of the inserted task, cause a portion of the source code corresponding to the associated location to be displayed.

31. The computer-readable medium of claim 25, wherein the parser module is further configured to, in response to detecting a comment token, extract a segment of the source code following the comment token, and wherein the task module is further configured to associate the extracted segment with the inserted task.

32. The computer-readable medium of claim 25, wherein the task module is further configured to:

receive information relating to a developer-specified task; and insert the developer-specified task into the task list.

33. The computer-readable medium of claim 32, wherein the developer-specified task is specified by selection of a location in the source code by the developer.

34. The computer-readable medium of claim 32, wherein the received information includes a task description.

35. The computer-readable medium of claim 25, wherein the task module is further configured to associate a priority rating with the inserted task.

36. The computer-readable medium of claim 35, wherein the parser module is further configured to parse the source code during the interactive code development session to detect the presence of a syntax error, and wherein the task module is further configured to determine the priority rating as a function of whether the source code contains a syntax error or a comment token.

37. The computer-readable medium of claim 36, wherein the task module is further configured to determine the priority rating as a function of a type of the comment token.

38. The computer-readable medium of claim 36, wherein the task module is further configured to determine the priority rating as a function of a type of the syntax error.

39. The computer-readable medium of claim 25, wherein the task module is further configured to respond to at least one of a build error and a deployment error by inserting a task into the task list.

40. The computer-readable medium of claim 25, wherein the task module is further configured to insert a task into the task list in response to receiving information from an external module.

41. The computer-readable medium of claim 25, wherein the display module is further configured to:
  receive at least one filtering criterion; and
  display at least a subset of tasks selected from the task list as a function of the at least one filtering criterion.

42. The computer-readable medium of claim 41, wherein the at least filtering criterion includes at least one of a completion status, a task category, a file, and a location.

43. The computer-readable medium of claim 42, wherein the task category is divided into a plurality of subcategories.

44. The computer-readable medium of claim 25, wherein the display module is further configured to sort a plurality of tasks in the task list as a function of at least one sort criterion.

45. The computer-readable medium of claim 44, wherein the at least one sort criterion includes at least one of a completion status, a task category, a file, and a location.

46. The computer-readable medium of claim 45, wherein the task category is divided into a plurality of subcategories.

47. The computer-readable medium of claim 25, wherein the task module is further configured to detect a completion status of a plurality of tasks in the task list.

48. The computer-readable medium of claim 47, wherein the task module is further configured to respond to detecting completion of a task by removing the completed task from the task list.

49. A computer arrangement comprising:
  an input module configured to receive at least one command from a developer during an interactive code development session;
  a parser module configured to parse source code during the interactive code development session to detect the presence of a comment token;
  a task module in communication with the parser module and configured to respond to detection of the comment token by inserting a task into a task list and to respond to completion of a task by modifying the task list to indicate that the task has been completed; and
  a display module in communication with the task module and configured to display the task list using a display device.

50. The computer arrangement of claim 49, wherein the comment token is associated with a keyword defined before the interactive code development session.

51. The computer arrangement of claim 49, wherein the comment token is associated with a keyword specified by the developer during the interactive code development session.

52. The computer arrangement of claim 49, wherein the comment token is associated with a keyword not subject to modification by the developer.

53. The computer arrangement of claim 49, wherein the comment token is selected from a set of comment tokens, and further comprising a token interface module in communication with the parser module and configured to detect a change to the set of comment tokens and to generate a notification in response to a change to the set of comment tokens.

54. The computer arrangement of claim 49, wherein the task module is further configured to:
  associate a location in the source code with the inserted task; and
  in response to selection of the inserted task, cause a portion of the source code corresponding to the associated location to be displayed.

55. The computer arrangement of claim 49, wherein the parser module is further configured to, in response to detecting a comment token, extract a segment of the source code following the comment token, and wherein the task module is further configured to associate the extracted segment with the inserted task.

56. The computer arrangement of claim 49, wherein the task module is further configured to:
  receive information relating to a developer-specified task; and
  insert the developer-specified task into the task list.

57. The computer arrangement of claim 56, wherein the developer-specified task is specified by selection of a location in the source code by the developer.

58. The computer arrangement of claim 56, wherein the received information includes a task description.

59. The computer arrangement of claim 49, wherein the task module is further configured to associate a priority rating with the inserted task.

60. The computer arrangement of claim 59, wherein the parser module is configured to parse the source code during the interactive code development session to detect the presence of a syntax error, and wherein the task module is further configured to determine the priority rating as a function of whether the source code contains a syntax error or a comment token.

61. The computer arrangement of claim 60, wherein the task module is further configured to determine the priority rating as a function of a type of the comment token.

62. The computer arrangement of claim 60, wherein the task module is further configured to determine the priority rating as a function of a type of the syntax error.

63. The computer arrangement of claim 49, wherein the task module is further configured to respond to at least one of a build error and a deployment error by inserting a task into the task list.

64. The computer arrangement of claim 49, wherein the task module is further configured to insert a task into the task list in response to receiving information from an external module.

65. The computer arrangement of claim 49, wherein the display module is further configured to:
  receive at least one filtering criterion; and
  display at least a subset of tasks selected from the task list as a function of the at least one filtering criterion.

66. The computer arrangement of claim 65, wherein the at least filtering criterion includes at least one of a completion status, a task category, a file, and a location.

67. The computer arrangement of claim 66, wherein the task category is divided into a plurality of subcategories.

68. The computer arrangement of claim 49, wherein the display module is further configured to sort a plurality of tasks in the task list as a function of at least one sort criterion.

69. The computer arrangement of claim 68, wherein the at least one sort criterion includes at least one of a completion status, a task category, a file, and a location.

70. The computer arrangement of claim 49, wherein the task category is divided into a plurality of subcategories.

71. The computer arrangement of claim 49, wherein the task module is further configured to detect a completion status of a plurality of tasks in the task list.

72. The computer arrangement of claim 71, wherein the task module is further configured to respond to detecting completion of a task by removing the completed task from the task list.

73. In a computer system having a graphical user interface including a display and a user interface selection device, a method of displaying a set of tasks associated with a development project and selecting a displayed task, the method comprising:

during an interactive code development session, evaluating source code to determine whether a comment token is present;

in response to determining that the source code contains a comment token, inserting a task into a task list;

in response to completion of a task, modifying the task list during the interactive code development session to indicate that the task has been completed;

displaying at least a subset of the set of tasks using the display;

receiving a selection signal indicative of a user selection of a task from the displayed tasks; and displaying a portion of the input source code corresponding to the associated location in the source code using the display.

74. The method of claim 73, further comprising selecting a subset of the set of tasks for display as a function of at least one filtering criterion.

75. A computer arrangement comprising:

an input module configured to receive at least one command from a developer during an interactive code development session;

a parser module configured to parse source code during the interactive code development session to detect the presence of at least one of a comment token selected from a set of comment tokens and a syntax error;

a token interface module in communication with the parser module and configured to detect a change to the set of comment tokens and to generate a notification in response to a change to the set of comment tokens;

a task module in communication with the parser module and configured to respond to detection of the at least one of a comment token and a syntax error by inserting a task into a task list and to respond to completion of a task by modifying the task list to indicate that the task has been completed; and a display module in communication with the task module and configured to display the task list using a display device.

\* \* \* \* \*